United States Patent [19]

Kaden

[11] 4,072,164

[45] Feb. 7, 1978

[54] DIAPHRAGM OPERATED FLOAT CONTROLLED VALVE

[76] Inventor: Walter Erich Kaden, 1525, General Hertzog Road, Vereeniging, Transvaal, South Africa

[21] Appl. No.: 686,247

[22] Filed: May 13, 1976

[30] Foreign Application Priority Data

May 13, 1975 South Africa .................. 75/3061

[51] Int. Cl. .............................................. F16K 31/18
[52] U.S. Cl. .................... 137/414; 137/426; 137/430; 137/446; 251/46
[58] Field of Search ............... 137/414, 426, 430, 433, 137/436, 438, 446, 451; 251/120, 46

[56] References Cited

U.S. PATENT DOCUMENTS

| 1,038,014 | 9/1912 | Stack ........................ 137/436 |
| 2,328,323 | 8/1943 | Blowers et al. .............. 137/414 |
| 2,588,242 | 3/1952 | Hunter ...................... 137/414 |
| 2,922,433 | 1/1960 | Techler ..................... 137/433 |
| 3,038,491 | 6/1962 | Beazley ..................... 137/426 |
| 3,074,684 | 1/1963 | Doyle ....................... 137/414 |
| 3,893,475 | 7/1975 | Hudson ...................... 137/433 |

FOREIGN PATENT DOCUMENTS 128,056 10/1928 Switzerland .................. 137/446

Primary Examiner—Martin P. Schwadron
Assistant Examiner—G. L. Walton
Attorney, Agent, or Firm—Millen & White

[57] ABSTRACT

A float controlled valve has a chamber and a first diaphragm forming a part of the chamber walls; a passage admits liquid from the valve inlet to the chamber; a second diaphragm forms a further part of the chamber walls and has a bleed-off passage which may be closed by action of the float; pressure build up in the chamber acts on the first diaphragm to close the valve; the pressure build up also acts on the second diaphragm to deflect the bleed off passage and so depress the float below the liquid surface when the valve closes; a sharp pointed and reduced diameter entrance to the passage at the valve inlet reduces blockage likelyhood; a helix on the float actuated means for closing the bleed-off passage provides facility for adjustments.

3 Claims, 4 Drawing Figures

DIAPHRAGM OPERATED FLOAT CONTROLLED VALVE

BACKGROUND OF THE INVENTION

This invention concerns improvements in and relating to valves, more particularly to valves for controlling the flow of any liquid, particularly the flow of water, or other liquids, at pressures in excess of ambient. Valves of the type to which this invention relates are useful for controlling comparatively effortlessly a large pressure drop across the valve when it is closed while at the same time providing a large through flow area to that there is a small loss of pressure when the valve is opened.

Valves are known in which liquid at inlet pressure is admitted to a space behind a diaphragm which acts to close the valve against the action of inlet pressure. Control of such valves is achieved by controlling the bleeding off of liquid under pressure from behind the diaphragm. An example is the U.S. Pat. No. 3,893,475 of July 8, 1975.

A problem arises in relation to such valves which are controlled by a float and are used for example in cattle drinking troughs. Wave action in the water causes the float to bob up and down resulting in the valve intermittently switching on and off, until the trough is eventually overfilled above its correct level, resulting in water wastage in most cases.

SUMMARY OF THE INVENTION

This problem may be overcome by a novel proposal of this invention to cause the ball to be depressed under the water when the valve closes. To achieve this the valve of this invention comprises a second flexible diaphragm constituting part of the walls of the chamber, which second diaphragm carries the bleed off passage, the bleed off passage being thus movably mounted, float means being provided and adapted to actuate means for closing the bleed off passage and adapted to be depressed by movement of the bleed off passage, when the second diaphragm is deflected by pressure of fluid in the chamber.

BRIEF DESCRIPTION OF THE DRAWINGS

The invention will be more fully described in relation to certain preferred embodiments which are illustrated in the accompanying drawings as follows.

DESCRIPTION OF THE PREFERRED EMBODIMENTS

Figure 1:
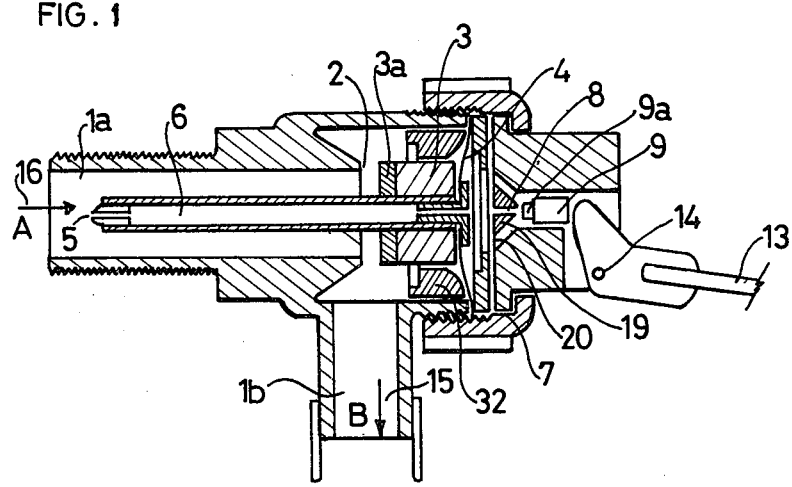
FIG. 1 is a cross-sectional front elevation of a valve in accordance with a first embodiment of the invention.

As shown in FIG. 1, the valve comprises a conduit for liquid comprising an upstream portion 1a and downstream portion 1b. At an intermediate position a valve seat 2 is located, being a circular and orthogonally orientated with respect to the axis of the upstream portion 1a of the conduit. A valve closure member 3 is provided with a sealing gasket 3a of flexible material and is fixed to a flexible diaphragm 4. Located upstream of the closure member 3 is an entrance 5 to a passage 6 which leads through the closure member 3 to a chamber 7. The chamber 7 is enclosed by walls comprising in part by the movable diaphragm 4. The attachment of the diaphragm 4 to the closure member 3 is adapted so that the diaphragm 4 will act on the closure member 3 with a force which is generated by pressure of liquid in the chamber 7. The area of the substantially movable part of the diaphragm 4, which corresponds with the area of the closure member 3 is substantially larger than the cross sectional area of the conduit which is encompassed by the seat 2. The chamber 7 is provided with a bleed off passage 8 the opening and closing of which is controlled by a means of a button 9. The button 9 has a resilient sealing end 9a. The bleed off passage 8 is provided in an axially movable nipple 19 which is attached to a second flexible diaphragm 20. The button 9 is actuated by a float (not shown) which is attached to the end of a crank 13 which is pivotally attached at 14 to the valve body.

The valve is shown in FIG. 1 in an open position. Since the valve closure member and diaphragm 4 are near the valve outlet B, pressure on the diaphragm will not greatly exceed atmospheric pressure and will be substantially balanced by pressure, which acts against the rear surface of the diaphragm, that is, inside the chamber 7. When the float is raised by rising water level, the button 9 is pressed onto the nipple 19, closing the bleed off passage 8. Water entering the chamber 7 via the passage 6 can no longer bleed off and pressure builds up inside the chamber 7 to the same pressure as that at the inlet A. The pressure in the chamber 7 acts, however, on the diaphragm 4 over an area which is equal to the cross sectional area of the closure member 3 and which is substantially larger than the cross sectional area encompassed by the seat 2. The total force acting therefore on the closure member 3 to open it is considerably less than the total force acting on it to close it and it moves to the closed position.

The flexible diaphragm 20 is so located and adapted that when the valve is in the open position as shown in FIG. 9 the nipple 19 is located in a given undeflected position. As soon as the button 9 closes the bleed-off passage 8 in the nipple 19, however, and pressure of liquid builds up in the chamber 7, this pressure acts on the diaphragm 20. This deflects the diaphragm and with it the nipple 19 to the right hand, deflecting also the button 9 to the right hand to a deflected position. This depresses the float (not shown), and results in the float coming to rest a distance below the free surface of the liquid after the valve has closed off. The distance below the water surface is determined by the degree of movement of the nipple 19, and by the arm ratio of the crank 13. Accordingly the free surface of the water must drop more than this distance before the nipple 19 opens the bleed-off passage 8. As soon as this happens pressure in chamber 7 drops, the valve opens and the diaphragm 20 and the nipple 19 move to the undeflected position. Accordingly the water level is again restored to the previous level before the valve closes off and again the float is then depressed by the distance below the free surface of the water.

This operation has an advantage for example in the application to cattle drinking troughs because it prevents the tendency caused by wave action to overfill the troughs.

The diaphragm 4 is preferably of thin, uniform thickness to provide great flexibility and great sensitivity to the valve. The "thin" cross section of the diaphragm is thinner than 1/10 of the diameter of the valve seat, preferably less than 1/15th. For a typical valve of say between 10 mm and 100 mm valve seat diameter the preferred thickness would be between 3 mm and 0.3 mm, preferably between 0.5 mm and 1.5 mm. The annular clearance between the member 3 and the surrounding annular support 31 is important to the thickness of the diaphragm. The clearance must be limited to a valve which will not permit the diaphragm to be blown out at the pressures at which the valve will be used.

The rigid, fixed, annular support surface 32 is adapted to support the diaphragm against the pressure of liquid in the chamber 7 when the valve is closed by being smoothly curved as shown. These features enable effective operation over an exceptionally wide range of pressures, for example between 1 or 2 meters head of water to the region of 1500 Pascal.

An important feature of the passage 6 is that the entrance 5 is made sharp pointed and the narrowest part of the passage 6 is at the entrance 5. Those features minimise any danger of the passage 6 becoming blocked by particles carried in the water.

Figure 2:
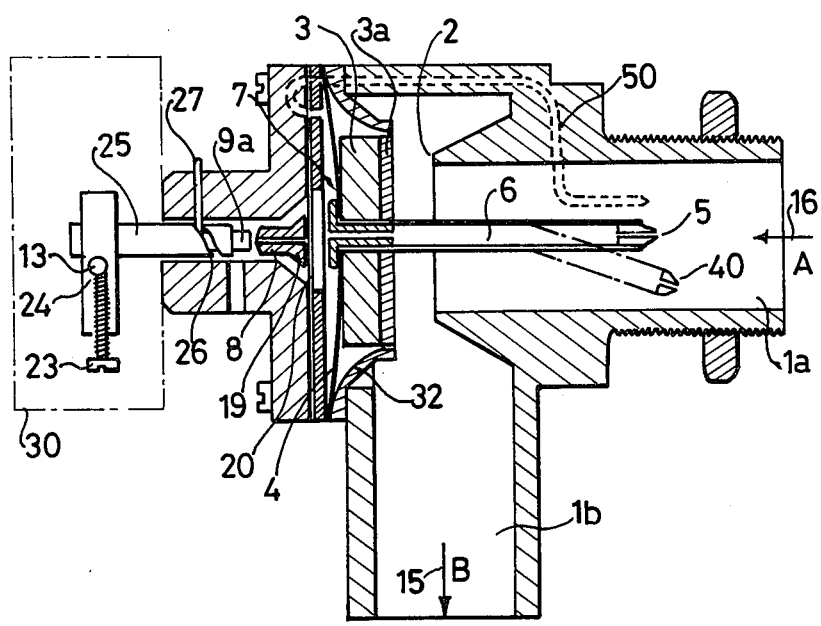
FIG. 2 is a cross sectional front elevation of a valve in accordance with a second embodiment of the invention.
Figure 3:
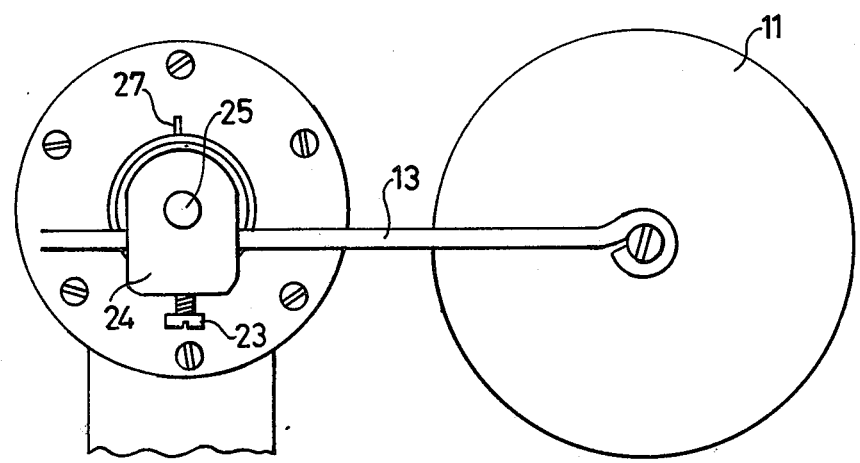
FIG. 3 is a side elevation of the valve shown in FIG. 2.

FIGS. 2 and 3 show an embodiment which is the same as that shown in FIG. 1, except that a different arrangement for the mounting of the float is used, having some advantages. The float arm 13 is adjustably fixed by means of a screw 23 to a boss 24 which carriers a shaft 25 having a helical groove 26 in its cylindrical surface. A pin 27 in the body of the valve runs in the groove 26, so that pivoting of the shaft 25 moves the button axially to close the bleed part 8. The angular position of the bush 24 (and hence the float arm 13) relative to the shaft 25 can be easily adjusted using screw 23, since it clamps arm 13 agains the shaft 25. Also the effective length of arm 13 can be adjusted to suit requirements of any particular installation. Similar parts are again indicated with the same reference numerals as before and the operation is the same as described with reference to FIG. 1.

Figure 4:
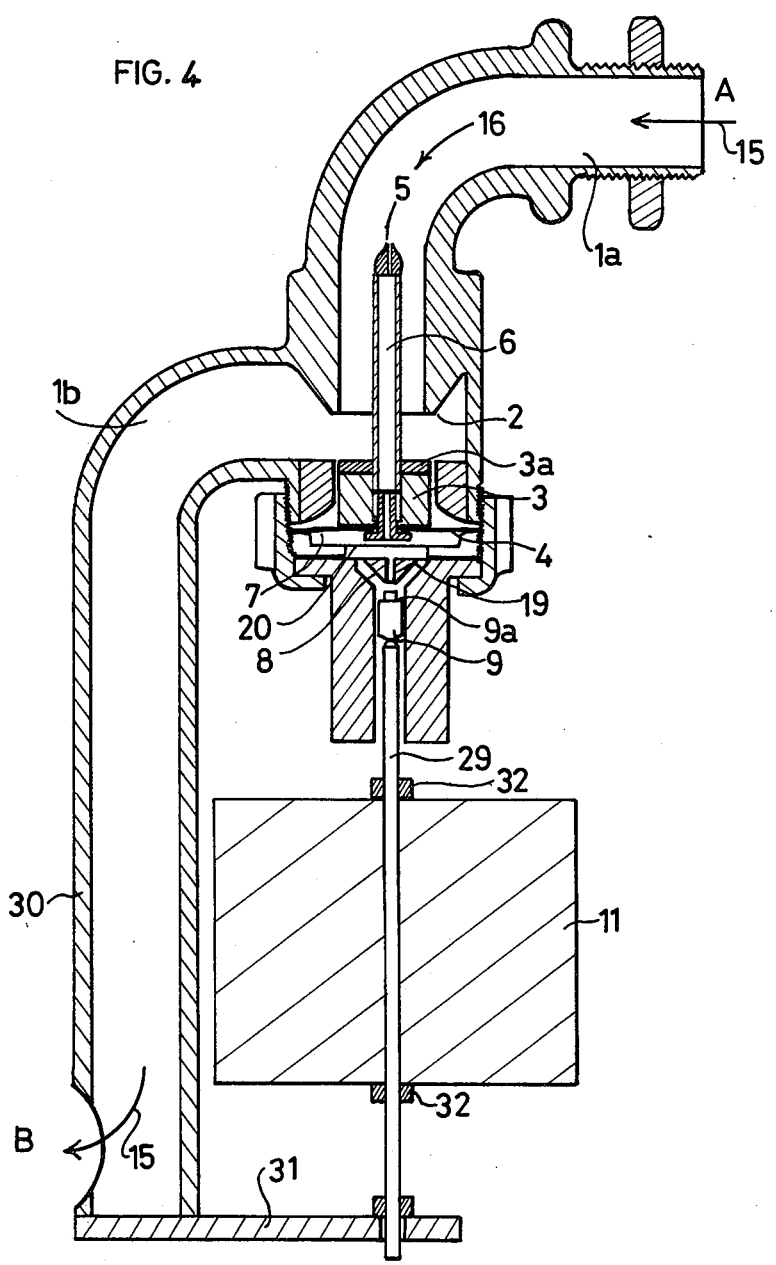
FIG. 4 is a cross sectional front elevation of a valve in accordance with a third embodiment of the invention.

FIG. 4 shows an embodiment the same as that shown in FIG. 1, except that again the float 11 is differently arrannged. Here the float 11 is mounted on a pin 29 coaxially with the valve seat and closure member and with the bleed passage for vertical axial movement in use. The outlet is extended downwards by a pipe 30 which carries a foot 31 for guiding the lower end of pin 29. Bushes 32 on the pin 29 are adapted to allow vertical adjustment of the level of the float 11. The upper end of the pin 29 actuates the button 9. Operation is in other respects as was described with reference to FIG. 1 and similar parts are again indicated with the same reference numerals.

It should be noted that, although possibly disadvantageous, the passage 6 could alternatively be provided in the body of the valve, e.g. as shown by broken line 50 in FIG. 2, providing the same effect.

What is claimed is:

1. A float valve which comprises a conduit for liquid, a valve seat located at an intermediate position of the conduit, a valve closure member movable when actuated onto the valve seat to close the valve and off the valve seat to open the valve, a passage whose entrance is located upstream of the valve seat and whose entrance is pointed upstream, a control chamber, the passage leading to the control chamber, the walls of which are formed in part by a first diaphragm and a second diaphragm, the first diaphragm being connected with the closure member so as to actuate it, the surface of the first diaphragm being of larger area than the cross sectional area of the conduit encompassed by the valve seat, the second diaphragm carrying a bleed off passage having a seat at its outer end, a bleed off passage closure bung, a float, a float connection linkage providing a mechanical connection between the float and the bung, the linkage adapted to cause the bung to move onto the bleed-off passage seat when the level of the float rises, and the linkage adapted to depress the float below the level of the liquid body if the second diaphragm is deflected outwardly and hence the bleed off passage moves outwardly, while the bung is on the bleed off passage.

2. A float valve according to claim 1, in which the communication between the control chamber and the liquid source is provided by a passage which has a minimum diameter at the inlet to the passage located at the liquid source.

3. A float valve according to claim 2, in which the inlet of the passage which communicates with the central chamber comprises a conical end with the passage inlet at the apex of the conical end.

* * * * *